United States Patent Office 3,493,572
Patented Feb. 3, 1970

3,493,572
PROCESS FOR PRODUCING QUINOXALINE-DI-N-OXIDES
James David Johnston, Old Saybrook, Conn., assignor to Chas. Pfizer & Co., Inc., New York, N.Y., a corporation of Delaware
No Drawing. Filed July 5, 1968, Ser. No. 742,538
Int. Cl. C07d 51/78; A61k 21/50
U.S. Cl. 260—250       5 Claims

ABSTRACT OF THE DISCLOSURE

The novel process for preparing Schiff bases derived from 2-formylquinoxaline-di-N-oxide and the 3-alkyloxy-carbonyl derivative thereof by reacting an appropriately substituted 2-acetalquinoxaline-di-N-oxide with at least an equimolar amount of an amino derivative in an inert solvent at a temperature of from about 30° C. to about 200° C. for a period of up to 24 hours in the presence of a strong acid.

BACKGROUND OF THE INVENTION

This invention relates to a novel synthetic procedure and, more particularly, to a novel method for the preparation of certain Schiff bases derived from 2-formylquinoxaline-di-N-oxides. The compounds prepared by the novel subject process are useful as urinary tract antiseptics, systemic anti-infectives, animal growth promotants and as agents for the control of chronic respiratory diseases in poultry and improvement of feed efficiency in animals.

SUMMARY OF THE INVENTION

Accordingly, the present invention discloses a process for the preparation of compounds of the formula:

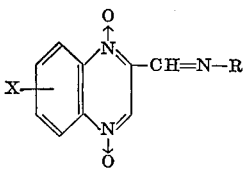

wherein X is selected from the group consisting of H, halogen (Br. Cl, F), trifluoromethyl, amino, hydroxy, mercapto, alkyl, alkyloxy and alkylsulfonyl, said alkyl groups containing from 1 to 4 carbon atoms; and R is selected from the group consisting of

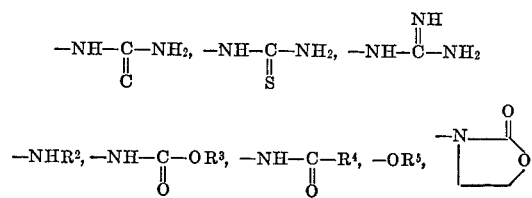

and

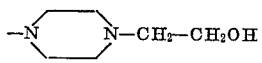

wherein $R^2$ is selected from the group consisting of phenyl, benzyl, alkyl and hydroxyalkyl, said alkyl group containing up to 4 carbon atoms, $R^3$ is selected from the group consisting of alkyl, hydroxyalkyl and haloalkyl, said alkyl group containing up to 4 carbon atoms, $R^4$ is alkyl of up to 4 carbon atoms or phenyl and $R^5$ is H or alkyl of up to 4 carbon atoms, which comprises reacting an acetalquinoxaline-di-N-oxide of the formula:

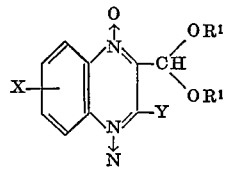

wherein X is as defined above, $R^1$ is alkyl of up to 4 carbon atoms and Y is selected from the group consisting of H and

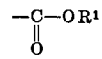

with at least an equimolar amount of an amino derivative having the formula:

$$R-NH_2$$

wherein R is as defined above in an inert solvent at a temperature of from about 30° C. to about 200° C. for a period of up to about 24 hours in the presence of at least a catalytic amount of a strong acid and subsequently recovering the resulting product.

A particularly preferred embodiment of the herein described invention concerns the above process wherein X and Y are hydrogen. For example, an even more specifically desired aspect of this process concerns the preperation of 2-formylquinoxaline-di-N-oxide by reacting 2-dimethylacetalquinoxaline-di-N-oxide with at least an equimolar amount of methylcarbazide in acetic acid at a temperature of about 100° C. in the presence of a catalytic amount of concentrated HCl. The starting materials which are necessary to carry out the process of this invention are either commercially available or easily prepared by well known standard organic techniques. The reaction is carried out in an inert solvent. An inert solvent for purposes of this invention contemplates any solvent which allows solubilization and is non-reactive toward either the reagents themselves or the products. Two preferred types include hydrocarbon solvents such as benzene, toluene, and xylene and alcoholic solvents such as methanol, ethanol and derivatives thereof, for example, ethylacetate. However, any solvent possessing the qualities set forth above will be satisfactory. The temperature at which the reaction is performed may vary from 30° C. to about 200° C. and for the most part will depend on the boiling point of the solvent used since reflux temperatures are most appropriate. Depending upon the particular product synthesized, the reaction time can vary from a few minutes to as long as 24 hours. Generally, to ensure complete reaction a longer time period is preferred. As a necessary ingredient of the herein disclosed process, it has been found that the presence of a strong acid is to be included. In many instances, a catalytic amount is sufficient, however, there may be an occasion where as much as an equimolar amount is added. The addition of such acid not only serves to accelerate the reaction but also to improve the yield of product. Since the amino derivative shown above can be used in the form of an acid addition salt, for example, the hydrochloride, sulfate, acetate, in such cases, it may not be necessary to add such acid catalyst since it will be supplied on dissociation of said acid addition salt. For purposes of this invention the term "strong acid" will include any species which allows protonation of the acetal reagent with the ability to cause its reversion to the free aldehyde.

With regard to the 2-acetalquinoxaline-di-N-oxide reagents, it has been stated above that their preparation can be effected by many suitable means. One such process concerns the oxidation of a quinoxaline derivative to the corresponding quinoxaline-di-N-oxide. A 2-methyl group can then be oxidized to formyl by known methods such as selenium dioxide oxidation.

The 2-acetalquinoxaline-di-N-oxide reagent can also be substituted in the benzene ring by any number of simple substituents usually found on aromatic rings such as amino, hydroxy, mercapto, alkyl, alkyloxy and alkylsulfonyl wherein said alkyl groups may contain from 1 to 4 carbon atoms. Thus, 2-acetal-quinoxaline-di-N-oxide or a substituted 2-acetalquinoxaline-di-N-oxide may be employed in the process of the present invention. Insofar as the acetal moiety is concerned, this is obtained using the well known reaction between an aldehyde and an alcohol in proper proportions. It is found that any dialkylacetal will be suitable for the process of this invention, however, it is preferred to use a dialkylacetal wherein said alkyl portion may contain from 1 to 4 carbon atoms. It is also a part of this invention to utilize as starting reagent a 2-acetalquinoxaline-di-N-oxide having substituted in the 3-position an alkyloxycarbonyl moiety. The alkyl ester portion may contain from 1 to 4 carbon atoms. Mechanistically, during the reaction hydrolysis, subsequent decarboxylation occurs to provide the desired product.

The second reagent is referred to as the amino derivative having the formula R—NH$_2$. Most if not all of these reagents are commercially available. Moreover, as indicated above, many exist for stability purposes in the form of acid addition salts.

The products are crystalline substances for the most part which precipitate from the reaction mixture. They are collected by suitable means and dried.

The novel compounds of this invention exhibit activity as urinary tract any systemic anti-infectives in animals, including man, against a wide variety of microorganisms including Gram-positive and Gram-negative bacteria. They are especially valuable against Gram-negative infections both in vitro and in vivo.

Further, the addition of a low level of one or more of the herein described Schiff bases to the diet of animals, both ruminant and non-ruminant, such that these animals receive the product over an extended period of time, at a level of from about 1 mg./kg. to about 100 mg./kg. of body weight per day, especially over a major portion of their active growth period, results in an acceleration of the rate of growth and improved feed efficiency. Included in these two classes of animals are poultry (chickens, ducks, turkeys), cattle, sheep, dogs, cats, swine, rats, mice, horses, goats, mules, rabbits, mink, etc. The beneficial effects in growth rate and feed efficiency are over and above what is normally obtained with complete nutritious diets containing all the nutrients, vitamins, minerals and other factors known to be required for the maximum healthy growth of such animals. The animals thus attain market size sooner and on less feed.

These feed compositions have been found to be particularly valuable and outstanding in the case of such animals as poultry, rats, hogs, swine, lambs, cattle, and the like. In some instances the degree of response may vary with respect to the sex of the animals. The products, may, of course, be administered in one component of the feed or they may be blended uniformly throughout a mixed feed; alternatively as noted above, they may be administered in an equivalent amount via the animal's water ration. It should be noted that a variety of feed components may be of use in the nutritionally balanced feeds.

EXAMPLE I 2-formylquinoxaline-di-N-oxide carbomethoxyhydrazone

To a solution containing 2-formylquinoxaline-di-N-oxide dimethylacetal (11.8 g., 0.05 M), methylcarbazide (5.0 g., 0.056 M) and acetic acid (140 ml.) is added conc. HCl (4.0 ml.). The resulting mixture is heated on a steam bath for approximately 20–30 minutes whereupon the mixture is allowed to stir at room temperature for about 24 hours. The solid material which precipitates is filtered and dried to provide a crystalline product having a M.P. 244.5–245° C.

EXAMPLE II

The procedure of Example I is repeated wherein the following solvents are used at their reflux temperatures instead of acetic acid with comparable results:

| | |
|---|---|
| Methanol | Toluene |
| Ethanol | Xylene |
| Ethyl acetate | |

EXAMPLE III

The procedure of Example I is repeated wherein the following acids are used in lieu of HCl in equivalent amounts with comparable results:

| | |
|---|---|
| HBr | H$_2$SO$_4$ |
| HI | H$_3$PO$_4$ |

EXAMPLE IV

The procedure of Example I is repeated wherein the following acetals are used in place of 2-formylquinoxaline-di-N-oxide dimethylacetal in stoichiometric equivalent amounts to provide good yields of product, i.e., 2-formylquinoxaline-di-N-oxide carbomethoxyhydrazone:

2-formylquinoxaline-di-N-oxide diethylacetal
2-formylquinoxaline-di-N-oxide dipropylacetal
2-formylquinoxaline-di-N-oxide dibutylacetal

EXAMPLE V

The procedure of Example I is repeated wherein stoichiometric equivalent amounts of the quinoxaline-di-N-oxide reagents shown below are used in place for 2-formylquinoxaline-di-N-oxide dimethylacetal to provide the products indicated in good yields:

| Quinoxaline-di-N-oxide reagent | Product |
|---|---|
| 6-methoxy-2-formylquinoxaline-di-N-oxide dimethylacetal. | 6-methoxy-2-formylquinoxaline-di-N-oxide carbomethoxy hydrazone. |
| 6-butyl-2-formylquinoxaline-di-N-oxide di-methylacetal. | 6-butyl-2-formylquinoxaline-di-N-oxide carbomethoxy hydrazone. |
| 6-bromo-2-formylquinoxaline-di-N-oxide di-methylacetal. | 6-bromo-2-formylquinoxaline-di-N-oxide carbomethoxy hydrazone. |
| 6-ethoxy-2-formylquinoxaline-di-N-oxide di methylacetal. | 6-ethoxy-2-formylquinoxaline-di-N-oxide carbomethoxy hydrazone. |
| 5-methyl-2-formylquinoxaline-di-N-oxide di-methylacetal. | 5-methyl-2-formylquinoxaline-di-N-oxide carbomethoxy hydrazone. |
| 7-trifluoromethyl-2-formylquinoxaline-di-N-oxide-dimethylacetal. | 7-trifluoromethyl-2-formylquinoxaline-di-N-oxide dimethylacetal. |

EXAMPLE VI

The same product produced by the procedure of Example I is obtained in the following manner. To a solution containing 3-ethoxycarbonyl-2-formylquinoxaline-di-N-oxide dimethyl acetal (0.3 g., 0.0089 M) and conc. HCl (5.0 ml.) is added methylcarbazide (0.15 g., 0.0017 M) dissolved in 15 ml. of methanol. The resulting mixture is allowed to stir at room temperature for about 4 hours. After this time period, the solid material which precipitates in filtered and dried to provide a good yield of crystalline product.

EXAMPLE VII

The procedure of Example VI is repeated wherein the following 3-alkoxycarbonyl derivatives are used, in stoichiometric equivalent amounts, in place of 3-ethoxycarbonyl - 2-formylquinoxaline-di-N-oxide dimethylacetal with comparable results:

3-methoxycarbonyl-2-formylquinoxaline-di-N-oxide dimethylacetal
3-propoxycarbonyl-2-formylquinoxaline-di-N-oxide dimethylacetal
3-butoxycarbonyl-2-formylquinoxaline-di-N-oxide dimethylacetal

EXAMPLE VIII

The procedure of Example I is repeated wherein the compounds listed herein below are prepared using a stoichiometric equivalent amount of the amino derivative, i.e. $R-NH_2$ instead of methylcarbazide with comparable results:

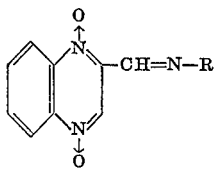

| R |
|---|
| —NHCOOCH($CH_3$)$CH_2$OH |
| —OH |
| —NH—COCH$_3$ |
| —NHCH$_3$ |
| —NHCOOC$_2$H$_5$ |
| NHCOOC$_4$H$_9$ |
| NHCOOC$_6$H$_{13}$ |
| NHCOO-t-C$_4$H$_9$ |
| NHC$_6$H$_5$ |
| NHC$_7$H$_7$ |
| NHCH$_2$CH$_2$OH |
| NH-i-C$_3$H$_9$ |

| R |
|---|
| NH(CH$_2$)$_4$OH |
| OCH$_3$ |
| OC$_4$H$_9$ |
| O-i-C$_3$H$_7$ |
| OC$_2$H$_5$ |
| NHCOOCH$_2$CH$_2$OH |
| NHCOO(CH$_2$)$_3$OH |
| 1-[4-($\beta$-hydroxyethyl)piperazine] |
| CH$_3$ |
| C$_4$H$_9$ |
| C$_6$H$_{13}$ |
| NHCONH$_2$ |
| NHCSNH$_2$ |
| NHC(NH)NH$_2$ |
| 3-(2-oxazolidonyl) |

EXAMPLE IX 2-formylquinoxaline-di-N-oxide semicarbazone

The procedure of Example I is repeated wherein a stoichiometric equivalent amount of semicarbazide hydrochloride is used in place of methylcarbazide with comparable results. No conc. HCl is added since the semicarbazide is in the form of the hydrochloride salt.

EXAMPLE X

The efficacy of several of the herein described quinoxaline-di-N-oxides in improving broiler chick and turkey poult performance is summarized in the following table. Supplementation of the rations with said compounds at various levels brought about economically significant gains in growth and feed efficiency.

The experimental birds and dietary treatments are assigned pens in accordance to randomized block designs. Each observation reported is an average of 6 pen replications, each pen containing 10 birds. The experiments are conducted in battery brooders for from 1 to 28 days of bird age. Controls are run using, of course, unsupplemented rations. For convenience in reporting results the percent change in the weight, feed efficiency and feed consumption over the corresponding values for the controls are reported. In each case, the control is assigned a value of 100%. An increase in performance for a given compound is then represented by a +value; e.g. +6.3% weight gain indicates an increase in weight amounting to 106.3% relative to 100% for the controls.

| Quinoxaline-di-N-oxide | Supplementation, g./ton | Percent above or below controls | | | Birds |
|---|---|---|---|---|---|
| | | Weight | Feed efficiency | Feed consumption | |
| 2-formyl-3-methyl-carbo-ethoxyhydrazone. | 125 | +4.2 | +2.6 | +2.0 | Chicks. |
| | 20 | +1.0 | +1.3 | −2.2 | Do. |
| 2-formyl-3-methyl-methyl-hydrazone. | 125 | +3.3 | +4.1 | +0.5 | Do. |
| | 20 | −1.2 | +1.1 | −2.2 | Do. |
| | 20 | +3.3 | +1.9 | | Do. |
| 2-formyl-carbo-methoxy-hydrazone. | 20 | +12.2 | +7.1 | | Poults. |
| | 10 | +2.3 | +1.9 | | Chicks. |
| | 10 | +11.6 | +6.4 | | Poults. |

What is claimed is:
1. A process for the preparation of compounds of the formula:

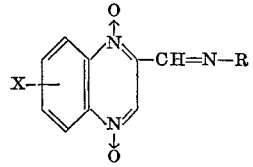

wherein X is selected from the group consisting of H, halogen (Br, Cl, F), trifluoromethyl, amino, hydroxy, mercapto, alkyl, alkyloxy and and alkylsulfonyl, said alkyl groups containing from 1 to 4 carbon atoms; and R is selected from the group consisting of

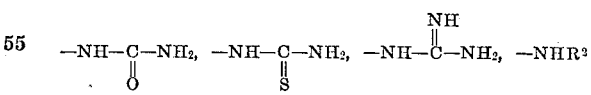

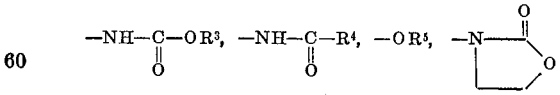

and

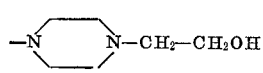

wherein $R^2$ is selected from the group consisting of phenyl, benzyl, alkyl and hydroxyalkyl, said alkyl group containing up to 4 carbon atoms, $R^3$ is selected from the group consisting of alkyl, hydroxyalkyl and haloalkyl, said alkyl group containing up to 4 carbon atoms, $R^4$ is alkyl of up to 4 carbon atoms or phenyl and $R^5$ is H or alkyl of up to 4 carbon atoms, which comprises reacting an acetalquinoxaline - di-N-oxide of the formula:

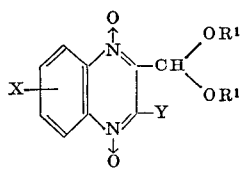

wherein X is as defined above, $R^1$ is alkyl of up to 4 carbon atoms and Y is selected from the group consisting of H and

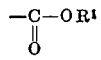

with at least an equimolar amount of an amino derivative having the formula:

$$R-NH_2$$

wherein R is as defined above in an inert solvent at a temperature of from about 30° C. to about 200° C. for a period of up to about 24 hours in the presence of at least a catalytic amount of a strong acid and subsequently recovering the resulting product.

2. A process as claimed in claim 1 wherein X and Y are H.

3. A process as claimed in claim 2 for the preparation of 2 - formylquinoxaline-di-N-oxide carbomethoxyhydrazone which comprises reacting 2 - dimethylacetalquinoxaline-di-N-oxide with at least an equimolar amount of methylcarbazide in acetic acid at a temperature of about 100° C. in the presence of a catalytic amount of conc. hydrochloric acid.

4. A process as claimed in claim 2 for the preparation of 2-formylquinoxaline-di-N-oxide semicarbazone which comprises reacting 2-dimethylacetalquinoxaline-di-N-oxide with at least an equimolar amount of semicarbazide hydrochloride in methanol at a temperature of about 50° C.

5. A process as claimed in claim 1 wherein Y is

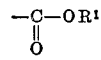

References Cited

UNITED STATES PATENTS 3,371,090   2/1968   Johnston _____ 260—250

NICHOLAS S. RIZZO, Primary Examiner